United States Patent [19]

Masse

[11] Patent Number: 4,671,951
[45] Date of Patent: Jun. 9, 1987

[54] PURIFICATION AND RECONCENTRATION OF WASTE SULPHURIC ACID

[75] Inventor: Gary M. J. Masse, Burlington, Canada

[73] Assignee: C-I-L Inc., North York, Canada

[21] Appl. No.: 918,608

[22] Filed: Oct. 10, 1986

Related U.S. Application Data

[63] Continuation of Ser. No. 703,403, Feb. 20, 1985, abandoned.

[30] Foreign Application Priority Data

Mar. 23, 1984 [CA] Canada .................................. 450440

[51] Int. Cl.[4] ...................... C01B 17/90; C01B 17/58; H05B 6/64
[52] U.S. Cl. .................................... 423/531; 423/522; 204/157.43; 204/157.49; 219/10.55 M; 219/10.57
[58] Field of Search ............... 423/521, 522, 531, 533, 423/532, 539; 219/10.55 M, 10.57; 204/157 R, 157 H, 157.43, 157.49

[56] References Cited

U.S. PATENT DOCUMENTS

| | | | |
|---|---|---|---|
| 3,577,322 | 5/1971 | Nesbitt et al. | 219/10.55 M |
| 3,771,234 | 11/1973 | Forster et al. | 219/10.55 M |
| 3,963,892 | 6/1976 | Camph et al. | 219/10.55 M |
| 4,055,001 | 10/1977 | Forster et al. | 219/10.55 M |
| 4,163,140 | 7/1979 | Bardet | 219/10.55 M |
| 4,310,739 | 1/1982 | Hatem | 219/10.55 M |
| 4,313,786 | 2/1982 | Smith | 219/10.55 M |
| 4,364,859 | 12/1982 | Ohtsuka et al. | 219/10.55 M |
| 4,409,064 | 10/1983 | Vora et al. | 423/522 |
| 4,417,116 | 11/1983 | Black | 219/10.55 M |
| 4,434,345 | 2/1984 | Muscat et al. | 219/10.57 |

OTHER PUBLICATIONS

Copson, David A., Microwave Heating in Freeze Drying Electronic Ovens & Other Applications, Avi Publishing Co., Westport Conn, 1962, pp. 371-373.
Kirk Othmer, Encyclopedia of Chemical Technology, Third Edition, 1981, John Wiley & Sons, N.Y., N.Y., pp. 494-498, 516-517.
Kuckhowski et al, Microwave Spectrum, Structure and Dipole Moment of Sulfuric Acid, J. Am. Chem. Soc., vol. 103, No. 10, 1981, pp. 2561-2566.
Cord et al, Microwave Spectral Tables, National Bureau of Standards, Monograph 70, vol. IV, Oct. 1968, pp. 385-386.

*Primary Examiner*—Gary P. Straub
*Attorney, Agent, or Firm*—Cushman, Darby & Cushman

[57] ABSTRACT

This invention relates to a process for the production of concentrated sulphuric acid from waste sulphuric acid which comprises subjecting said waste acid to microwave energy for a sufficient period of time to effect production of water vapor, whereby said waste acid is concentrated to a desired degree; removing said water vapor; and collecting said concentrated acid.

4 Claims, 2 Drawing Figures

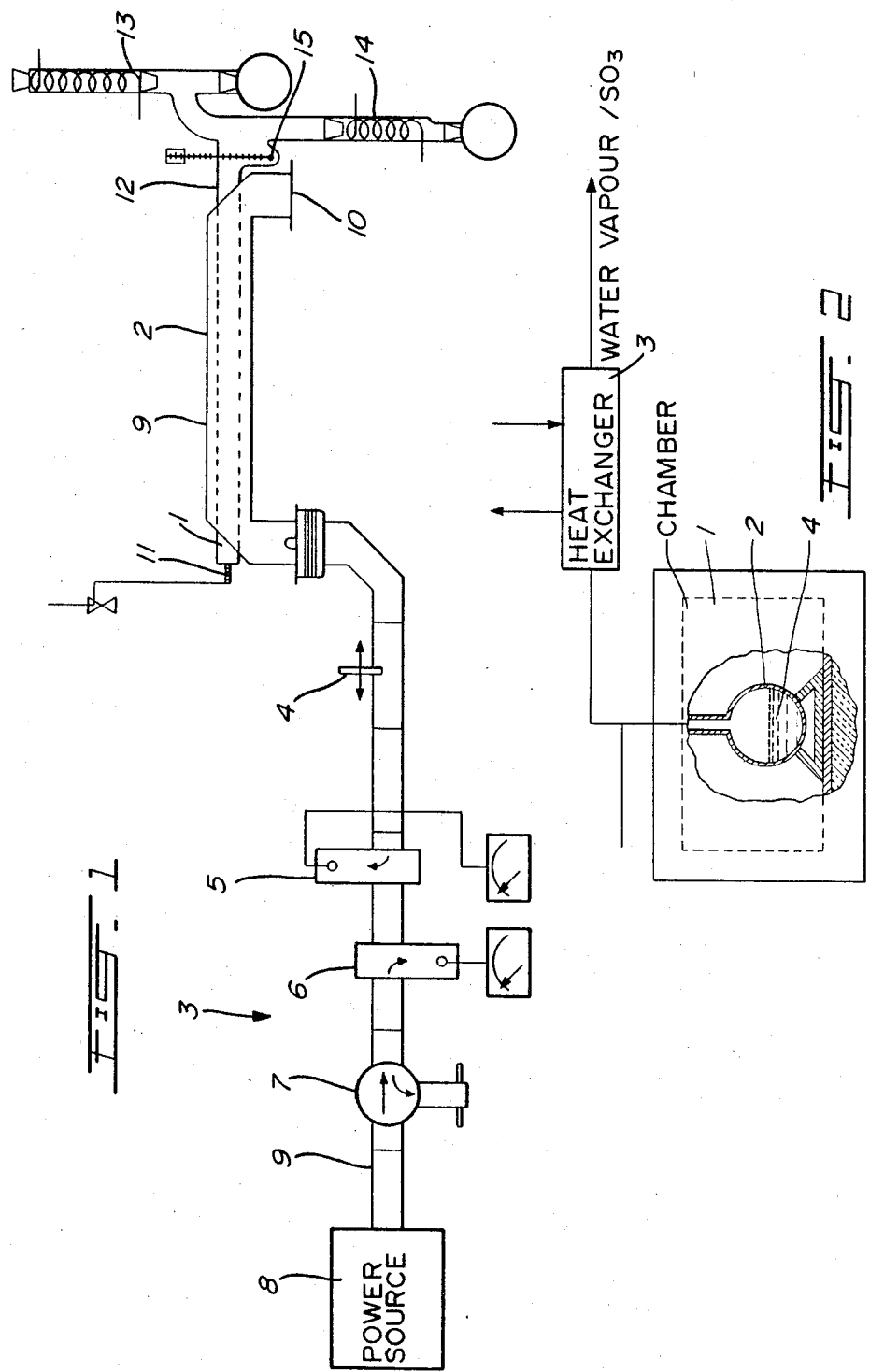

PURIFICATION AND RECONCENTRATION OF WASTE SULPHURIC ACID

This is a continuation of application Ser. No. 703,403, filed Feb. 20, 1985, which was abandoned upon the filing hereof.

This invention relates to apparatus and processes for the purification and production of concentrated sulphuric acid and, more particularly, to the production of concentrated sulphuric acid from waste sulphuric acid using microwave radiation.

Many processes in the chemical industry which use sulphuric acid either as a reagent or solvent produce a waste acid stream which must be dealt with. In some instances, it is possible to re-use the waste acid stream directly, but, in the majority of cases some upgrading treatment of the waste acid must be carried out. However, because virgin sulphuric acid is relatively cheap almost any regeneration scheme is economically unattractive. While the disposal of waste acid has long been a problem, a solution has become increasingly urgent since these wastes, if not treated, present a threat to the environment. Thus, due to these disposal concerns processes have been developed to regenerate specific waste acids.

Spent sulphuric acids can be broadly categorized into two groups—that group whose principal contaminant is water (e.g. sulphuric acid from drying operations), and that group having principally an organic contaminant (e.g. sulphuric acid from petroleum alkylation). To-date, no generally accepted universal process has been developed suitable for the recovery of sulphuric acid from both groups of waste acids.

The main problems to be addressed in any process are the high energy costs associated with the removal of water from the spent acid, the accelerated corrosion characteristics associated with upgrading waste acids, and the conditions required for the removal of inorganic and/or organic contaminants.

Thus, processes which are capable of dealing with all of the vast array of waste sulphuric acids produced are extremely rare. In the case of slightly contaminated, but dilute, waste acids, these have been treated by, (i) the Simonson-Mantius concentrator (brick-lined vessel under vacuum), (ii) Chemico drum concentrator (hot furnace gas in direct contact with the waste acid), and (iii) the Pauling concentrator (acid is heated in cast iron vessels). All of these processes are found to have certain limitations, including the materials of construction limiting the processing temperatures and formation of deposits on the heating surfaces which impair the heating efficiency.

In the case of the treatment of waste acids which contain high levels of non-volatile organic materials, this usually involves the attainment of temperatures which effect the thermal decomposition of the acid to sulphur dioxide and water, via sulphur trioxide, with subsequent re-oxidation of the sulphur dioxide to sulphur trioxide for use in sulphuric acid manufacture. This method is high in capital cost and energy requirement. Decomposition of the waste acid to sulphur dioxide for it to be re-oxidized to sulphur trioxide is an expensive redundancy. Further, certain gaseous impurities which remain in the sulphur dioxide gas after the cleaning process may have a deleterious effect on the oxidation step in a sulphuric acid plant.

The thermal decomposition of sulphuric acid is an endothermic process and requires external heat energy. The heat requirement amounts to 275 kJ/mol, in accordance with the reaction equation:

$$H_2SO_4(l) \rightarrow H_2O(g) + \tfrac{1}{2}O_2(g) + SO_2(g)$$

The composition is formed in two steps, namely:

$$H_2SO_4(l) \rightleftharpoons H_2O(g) + SO_3(g) \tag{1}$$

$$SO_3(g) \rightleftharpoons SO_2(g) + \tfrac{1}{2}O_2(g) \tag{2}$$

One method of recovering waste acid is to subject it to thermal degradation to produce sulphur trioxide and water vapour, and to recover said gas and water vapour. Some water may be retained in the form of sulphuric acid vapour, but as the degradation temperature increases, the equilibrium between $SO_3$, $H_2O$ and $H_2SO_4$ is overwhelmingly displaced towards $SO_3$ and $H_2O$. At 500° C., there is almost complete degradation of acid into $H_2O$ and $SO_3$. At higher temperatures the unwanted thermal decomposition of sulphur trioxide to sulphur dioxide (equation 2) occurs. Thus, it can be seen that in both of equations 1 and 2 appreciable amounts of energy are required, with the first step consuming more heat than the second.

One source of energy available for the heating of certain materials is that produced by microwave irradiation. Microwave energy in the 800–3000 MHz range has been widely used for cooking and reheating of foods in microwave ovens. Frequencies of approximately 915 and approximately 2450 MHz are the ones primarily used in North America for this purpose, although other frequencies, notably 5850 MHz and 18000 MHz, are also available. In Western Europe, 896 MHz is generally used, and in Japan 100–450 kHz or 40–50 MHz is generally used.

An example of the industrial use of microwave radiation has been described in U. K. Patent No. 1,567,129, in the name of Foster Wheeler Energy Corporation. In Patent No. 1,567,129, microwave radiation is used to desorb any adsorbed sulphur dioxide from coal, coke or char by subjecting the coal and the like to radiation at a frequency sufficient to cause arcing, thereby oxidizing a portion of the carbon and thus increasing the temperature of the coal.

However, despite the successful application of microwave radiation to foodstuffs, the stigma of microwave equipment poorly designed to meet the needs of the chemical process industry has severely hampered its utility in this field. In addition, microwave technology generally suffers from the reputation of being prohibitively expensive.

Surprisingly, we have now discovered a process for the purification and production of concentrated sulphuric acid from waste sulphuric acid which is applicable to both dilute and heavily organic-contaminated waste sulphuric acids. The process further provides reduced overall energy consumption, lower capital cost with improved simplicity of operation, and reduced corrosion of acid recovery plant components.

A specific object of this invention is to provide a method of utilizing microwave energy for the purification and production of concentrated sulphuric acid.

We have found that the application of microwave radiation as an energy source to a body of waste sulphuric acid may produce a two-fold result.

When dilute, slightly contaminated, waste sulphuric acid is irradiated the acid is concentrated by the loss of water vapour. In addition, we have found that non-volatile organic materials may be removed by steam distillation along with excess water vapour to produce a concentrated and purified sulphuric acid.

When waste sulphuric acid highly contaminated with organic material is irradiated to a sufficient degree, sulphur trioxide and water vapour, with relatively minor amounts of sulphur dioxide, are liberated. The sulphur trioxide is generally free of organic material and can be efficiently used to manufacture fresh sulphuric acid.

We have found that the application of microwave energy to spent sulphuric acid can be used for the purification and/or concentration, as the case may be, of sulphuric acid and thus provide a general universal process which yields economic savings in plant cost, maintenance of operation through reduced corrosion, and energy costs.

Accordingly, the invention provides a process for the production of concentrated sulphuric acid from waste sulphuric acid comprising subjecting said waste acid to microwave energy for a sufficient period of time to effect production of water vapour, whereby said waste acid is concentrated to a desired degree; removing said water vapour; and collecting said concentrated acid.

The removal of excess water from the waste acid can be effected by microwave irradiation either in a batch process or, preferably, in a continuous process. A batch system generally involves the use of a reaction pot or vessel inside a microwave oven and containing the waste acid during the irradiation step and means, such as a vacuum system, for removing the excess water produced as vapour. After the waste acid has been concentrated to the desired degree the concentrated acid is removed from the pot as product. The time required to achieve the required concentration depends upon expected parameters such as the nature and concentration of the feed waste acid, acid strength desired and wavelength of the microwave radiation used. Such parameters can be easily determined by those skilled in the art.

In a preferred process, the waste acid is fed continuously through a microwave field applicator to interact with the microwave energy. In such a process, the degree of interaction between the waste acid and the microwave field is controlled by the attenuation constant and penetration depth. These are, of course, dependent on the dielectric properties of the waste sulphuric acid. If it turns out that the penetration depth is either considerably less or considerably greater than the dimensions of the volume of sulphuric acid subjected to irradiation in the microwave field applicator, the efficiency of the interaction between the microwave energy and the waste acid will decrease. In this situation, special applicator techniques may be required to realize acceptable utilization of microwave power. Penetration depth can be controlled by wavelength, $\lambda$. In simple systems, 915 MHz energy has a penetration depth roughly three times that of 2450 MHz energy.

The concentrated acid product emerges from the base of the applicator while the excess water, volatile, and possibly non-volatile organic materials as steam distillate exit from the top of the applicator.

Thus, in a preferred form the invention provides a process as hereinbefore defined further comprising continuously feeding said waste acid to a microwave applicator; subjecting said waste acid to microwave energy in said applicator for a sufficient period of time to effect production of water vapour whereby said waste acid is concentrated to a desired degree; removing said water vapour from said applicator; and collecting said concentrated acid from said applicator.

The above processes may be simply modified to be applicable to the production of concentrated and purified acid by irradiating the waste acid in such manner as to not only boil off the excess water but also to liberate sulphuric acid as vapour in equilibrium with water and sulphur trioxide. This modified process is highly desirable when the waste acid contains relatively large amounts of organic or inorganic contaminant. We have found that although the sulphur trioxide liberated may have organic material present, it can be collected and used to manufacture fresh sulphuric acid. In addition, under the relatively mild conditions for the production of the sulphur trioxide as described hereinabove there is a minimal amount of degradation to sulphur dioxide caused by the reduction of the sulphur trioxide by organic species in the vapour.

Accordingly, the invention further provides a process as hereinbefore defined wherein said waste sulphuric acid contains organic or inorganic contaminant and wherein said waste acid is subjected to microwave energy for a sufficient period of time to effect production of a gaseous mixture comprising sulphuric acid, sulphur trioxide and water vapour, collecting all or part of said gaseous mixture and producing sulphuric acid therefrom.

It will be appreciated that when the process of the invention is used for the purpose of concentrating sulphuric acid by the removal of water vapour, only acid of a desired strength up to the azeotropic mixture strength can be obtained. Further irradiation will convert the liquid azeotrope to the gaseous mixture. Thus, if the waste sulphuric acid is clean and merely dilute, concentration up to the azeotropic strength is possible, with the concentrated product acid remaining behind. Further irradiation of the clean concentrated acid is unnecessary and wasteful of energy.

If the waste sulphuric acid is dilute and contaminated, concentration of the acid up to the azeotropic strength followed by continued irradiation forms the azeotropic gaseous mixture contaminated with organic matter. Condensation of this gaseous mixture will produce clean sulphuric acid of azeotropic strength. If concentrated contaminated acid of $>$ azeotropic strength is irradiated, condensation of the resultant gaseous mixture will produce clean concentrated acid of similar strength as that of originating waste acid.

It is well known that there is extremely poor interaction between microwave radiation and material in the vapour state. This is because the molecules in the vapour state already have appreciable amounts of rotational, vibrational and translational energy, and also because the vapour cannot provide a sufficient depth of penetration for the microwave radiation to permit interaction with the molecules. Thus, it is found that the temperature of the vapour does not increase beyond that at which it is produced from the bulk liquid. This is to be contrasted with the conventional art heating methods wherein the coolest entity in the system is the bulk liquid to be vaporised. Heating of the liquid container wall in prior art processes causes the resultant vapour to interact with said walls to effect increases in vapour temperature. It can thus be seen that there is a reduced risk of causing sulphur trioxide vapour breakdown to sulphur dioxide in the processes according to the invention.

We have found that some organic materials are unexpectantly removed under the influence of the microwave energy. These materials may have been destroyed through destruction in the strong acid, vaporised directly or, for example, by steam distillation, or converted to a more volatile or steam-distillable material. Such destruction or removal is thus more possible with microwave energy than with conventional energy processes since hotter, localised temperatures are attainable in the bulk liquid phase since no heat transfer surfaces are required as microwave heating is independent of the container wall surface.

In the case of non-volatile inorganic contaminants, these may be removed by subsequent processing, e.g. filtration of cooled waste acid following irradiation. Such filtered waste acid could be recycled back through the microwave system.

The processes according to the invention can be carried out utilizing equipment similar to that used in commercial microwave heating in the food industry. The apparatus would, of course, have to be modified because of the peculiarities of sulphuric acid processing and the volumes of vapours evolved.

Accordingly, in a further feature the invention provides apparatus for the production of concentrated sulphuric acid from waste sulphuric acid comprising container means for containing said waste acid, microwave means for subjecting said waste acid in said container means to microwave energy for a sufficient period of time to effect production of water vapour whereby said waste acid is concentrated to a desired degree, and means for removing said water vapour.

The container means can be a reaction pot or vessel or preferably, a glass or quartz tubular reactor disposed within a microwave applicator.

Thus, in a preferred feature the invention provides apparatus as hereinabove defined wherein said container means comprises a glass or quartz tubular reactor disposed within a microwave applicator, and further comprising means for feeding said waste acid to said tubular reactor and means for collecting said concentrated acid product from said tubular reactor.

In yet a further feature the invention provides apparatus as hereinbefore defined modified for the production of concentrated sulphuric acid from waste acid containing relatively high amounts of organic or inorganic materials, which apparatus comprises said microwave means capable of subjecting said waste acid in said container means to microwave energy for a sufficient period of time to effect production of a gaseous mixture comprising sulphuric acid, sulphur trioxide and water vapour; means for isolating all or part of said gaseous mixture, and means for producing sulphuric acid from said isolated gaseous mixture.

An advantage of using microwave radiation according to the processes of the invention is that sulphuric acid absorbs the electromagnetic energy uniformly, inside the container means and not just at the surface of the container. The heat buildup takes place extremely rapidly and is controlled, almost instantaneously, by the power applied. Since the energy transfer occurs by radiation rather than surface-to-surface contact, the attainable temperature is limited primarily by the thermal decomposition temperature of the material being processed.

Not all materials absorb microwave radiation. Some materials, such as metals, reflect microwaves, while others, such as paper, glass and many plastics, transmit the waves without interaction. Thus, in the process and apparatus according to the invention, any material which transmits microwave radiation without interaction and is not attacked by sulphuric acid represents a desirable material of construction—glass or quartz are preferred examples. The desirability of glass or glass-lined container means of use in instant invention may be contrasted to prior art sulphuric acid recovery systems wherein glass is generally not employed because of the thermal shock that can be produced due to the surface-to-surface heating and because of its poor heat transfer coefficient. However, in instant process, these disadvantages are not present. Indeed, since glass is more corrosion resistant than iron or, if sodium ions are present in the spent acid, acid brick—especially at elevated temperatures, glass offers an additional advantage.

Another advantage of using microwave radiation according to the process of the invention is that relating to energy costs. In the majority of the prior art techniques, steam is consumed, in addition to the direct energy requirements for the waste acid treatment, in order to maintain a vacuum in the reactor and permit the reconcentration to occur at a relatively lower temperature. The cost of this additional steam requirement can be substantial and may be as high as $10/tonne of waste acid and easily outweigh the fact that the conversion of electric line power to microwaves is approximately 75% efficient. The importance of this feature can be clearly highlighted by the fact that the total power cost to generate sufficient microwave radiation to reconcentrate 70% $H_2SO_4$ to 98% is $10.60/tonne (electric power=2.6¢/kw-hr).

In the processes of the invention acid recovery efficiencies as high as 95% have been obtained. During irradiation, exit gas temperatures of 100°-320° C. have been observed after five minutes of start up, with the temperature obtained being dependent on the nature of the waste acid. In all instances, the exit vapours (water and/or sulphuric acid and sulphur trioxide) were colourless, even though it was noted that some decomposition of organic material accompanied the waste acid treatment. Waste acid as low as 20% acid has been concentrated to 96-97% strength. However, the processes according to the invention may be used to concentrate spent acid obtained from processes involving pickling of metals and having an acid strength of, say, 8%, to provide acid at the useful concentration of 18% strength.

Preferably, the microwave energy is applied at a frequency of 915, 2450, 5850, or 18,000 MHz.

In order that the invention may be better understood, several embodiments will now be described by way of example only and with reference to the drawings wherein:

FIG. 1 is a schematic diagram of a preferred apparatus and process according to the invention; and FIG. 2 is a schematic diagram of an alternate embodiment of the apparatus and process according to the invention.

FIG. 1 shows a tubular quartz reactor (2.5 cm O.D.) 1 fitted inside a microwave applicator 2 linked to a commercial microwave generator 3.

The generator 3 further comprises a slide screw tuner 4 to minimize reflected power, directional couplers 5 and 6 to sample forward and reflected power, and circulator 7 to prevent reflected power from reaching microwave power source 8. Each of above form part of a waveguide 9. The waveguide in the applicator terminates with a shorting plate 10.

The microwave applicator is designed to efficiently deliver the microwave field to the reactor 1. The dimensions of the waveguide are designed to support a standing wave and can be easily determined by those skilled in the art. In the embodiment shown the WR340 waveguide dimensions of 15 cm long by 8.5 cm high by 4.2 cm deep support a standing wave of 2450 MHz and provides an interaction zone of approximately 30 cm.

Reactor 1 has a waste acid inlet 11 and outlet 12, to which outlet 12 is attached lower and upper condenser and receiving vessel systems 13 and 14, respectively, which constitute a liquid-vapour separator system. A control thermometer 15 is provided to signal a temperature controller (not shown).

In operation, chlorine drying waste dilute sulphuric acid (70% $H_2SO_4$) was fed through inlet 11 to reactor 1 at a rate of 30 g/min. Microwave power of 740 watts provided a standing wave of 2450 MHz to the waveguide in applicator chamber 2 sufficient to irradiate and concentrate the waste acid through the loss of water vapour and inert gases to 93.8% at a temperature of 292° C. The concentrated acid falls to the lower condenser and receiving system 14 for recovery while the water vapour and gaseous impurities exit through the upper condenser and receiving system 13.

An energy balance demonstrated that greater than 90% of the microwave energy was transferred to the waste sulphuric acid. A summary of the analytic work is as follows:

|  | Before | After |
| --- | --- | --- |
| Acid strength, % | 70 | 93.8 |
| Chloride, ppm | 6 | 3 |
| Total Organic Carbon, ppm | 37 | 9 |
| Free chlorine, ppm | 2.8 | 2.5 |
| Colour, Hazen units | 30 | 30 |

When energy transfer to the waste acid and acid temperature is sufficiently high sulphuric acid vapour is liberated in equilibrium with sulphur trioxide and water vapour. The acid and sulphur trioxide are recovered in the upper condenser and receiving system 14 to generate fresh sulphuric acid. By this latter approach the process may be used to regenerate waste acid containing appreciable amounts of contaminates. In this case the sulphuric acid vapour, sulphur trioxide and water vapour are collected in upper system 13 whereas enhanced contaminated concentrated waste acid is collected in lower system 14. In one run of such a process a waste acid containing 75% sulphuric acid, 20% organic contaminant and 5% water was irradiated and resulted in the recovery of a mixture containing 94% sulphur trioxide (g) and 6% sulphur dioxide (g). Other spent acids such as alkylation waste acid and sulphonation waste acids may produce varying but still favourable sulphur trioxide/sulphur dioxide ratios. It can thus be seen that this technique circumvents the necessity of the re-oxidation of sulphur dioxide and is, thus, economically attractive.

FIG. 2 shows an alternative embodiment of a process and apparatus according to the invention involving a noncontinuous or batch process. It shows a Litton commercial microwave oven chamber 1 modified to accept a glass distillation pot 2 connected to a heat exchanger 3. In this process, the glass vessel 2 contains waste sulphuric acid 4 irradiated with microwave energy (2450 MHz) sufficient to produce a stream of water vapour, sulphuric acid vapour, sulphur dioxide, sulphur trioxide and a small amount of other gases. These gases may be cooled by means of heat exchanger 3 and recovered. The relative concentrations of these vapours in the stream is dependent upon the nature of the waste acid.

In one specific run, chlorine drying waste acid (164.3 g, 70% $H_2SO_4$) was heated for 50 minutes using 2450 MHz radiation. Within 2 minutes, vapours began to exit from the oven at 100° C., and after 20 minutes the temperature of the vapour had risen to 230° C. A summary of the analytic work is shown, thus:

|  | Before | After |
| --- | --- | --- |
| Acid strength, % | 70 | 94.2 |
| Chloride, ppm | 4 | <0.31 |
| Total organic carbon, ppm | 30.5 | 3.89 |
| Colour | Yellow | Colourless |

The above embodiments describe continuous and batch processes for the purification of sulphuric acid. The exact conditions necessary to carry out the processes will be dependent on factors such as the nature and concentration of the feed waste acid, acid strength desired, acid flow rate and wavelength of microwave radiation used, and can be easily determined by those skilled in the art.

I claim:

1. A process for the production of concentrated sulphuric acid from waste sulphuric acid comprising subjecting said waste acid to microwave energy at a frequency selected from 915, 2450, 5850 and 18,000 MHz for a sufficient period of time to effect production of water vapour, wherein said waste acid is concentrated to a desired degree; removing said water vapour, and collecting said concentrated acid.

2. A process as claimed in claim 1 comprising continuously feeding said waste acid to a microwave applicator; subjecting said waste acid to microwave energy in said applicator for a sufficient period of time to effect production of water vapour wherein said waste acid is concentrated to a desired degree; removing said water vapour from said applicator; and collecting said concentrated acid from said applicator.

3. A process as claimed in claim 1 wherein said waste acid is subjected to said microwave energy in a reaction pot.

4. A process as claimed in any one of claims 1 to 3 wherein said waste sulphuric acid contains material contaminant and wherein said waste acid is subjected to microwave energy for a sufficient period of time to effect production of a gaseous mixture comprising sulphuric acid, sulphur trioxide and water vapour; collecting all or part of said gaseous mixture and producing sulphuric acid therefrom.

* * * * *